United States Patent [19]
Mori

[11] 3,828,253
[45] Aug. 6, 1974

[54] QUANTIZED INDICATION ARRANGEMENT

[75] Inventor: Chiharu Mori, Tokyo, Japan

[73] Assignee: Asahi Kogaku Kogyo Kabushiki Kaisha, Tokyo-to, Japan

[22] Filed: Sept. 7, 1972

[21] Appl. No.: 286,988

[30] Foreign Application Priority Data
Sept. 11, 1971 Japan.............................. 46-70510

[52] U.S. Cl................................ 324/99 D, 356/226
[51] Int. Cl. ......................... G01r 17/06, G01j 1/44
[58] Field of Search................. 324/99 R, 99 D, 98; 356/226

[56] References Cited
UNITED STATES PATENTS
| | | | |
|---|---|---|---|
| 435,896 | 9/1890 | Howell | 324/98 |
| 3,634,763 | 1/1972 | Micale | 324/99 D |

Primary Examiner—Alfred E. Smith
Assistant Examiner—Ernest F. Karlsen
Attorney, Agent, or Firm—Christie, Parker & Hale

[57] ABSTRACT

A quantized indicating unit. A controllable constant current source is connected in a circuit path for current flow. A plurality of parallel resistors are provided, together with means for selectively coupling any one of the resistors into the path for current flow. A scanner sequentially scans through a sequence of states. A coupling means responds to each different one of the states for coupling at least one different resistor into the current path, thereby causing, for each of the states, a signal on the coupled resistor corresponding to the amount of the current flow and to the coupled resistor. A source of reference signals is provided, together with a comparing circuit for comparing the signal with the reference signal. An indicating element is provided for each of the resistors. A gate is coupled to the scanner and the comparing means and is responsive to a correspondence detected by the comparing means for switching an indicating element into an indicating condition, which element corresponds to the resistor that is coupled into the current path.

9 Claims, 6 Drawing Figures

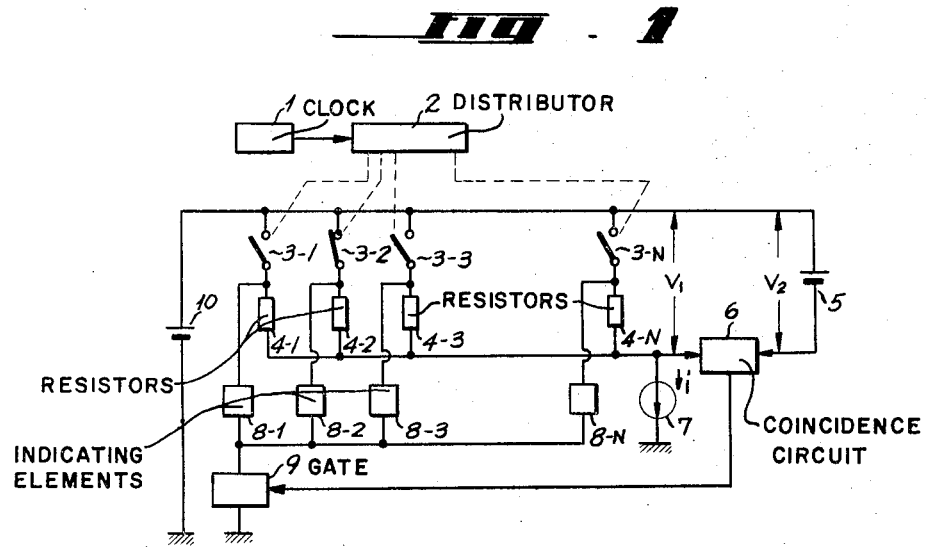
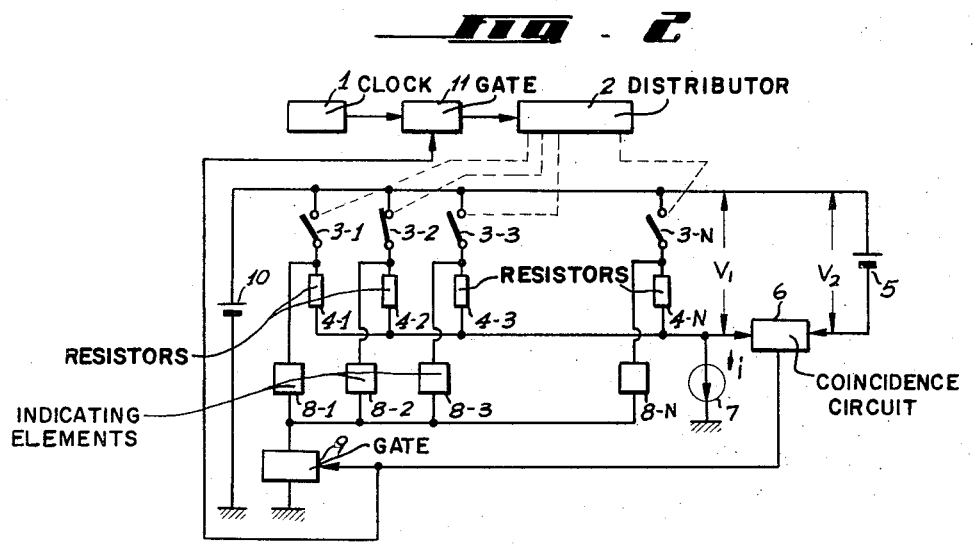
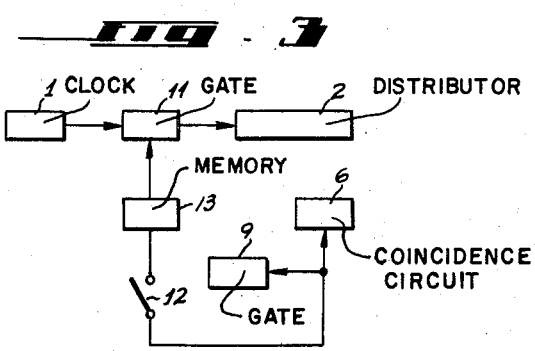

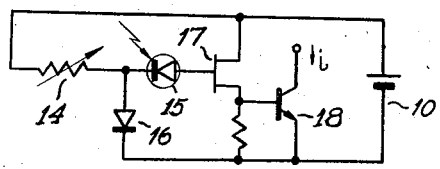
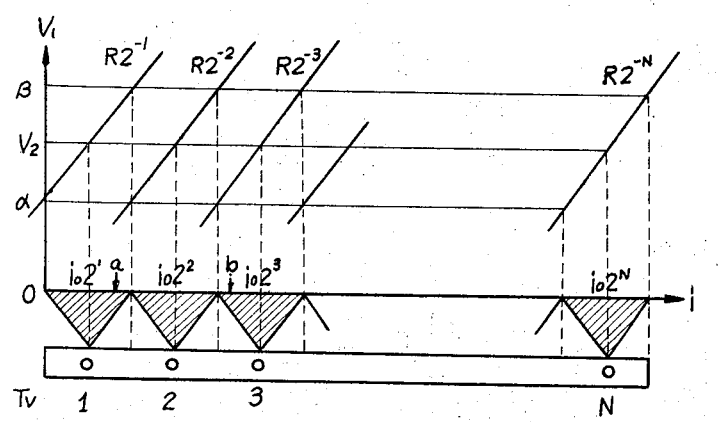
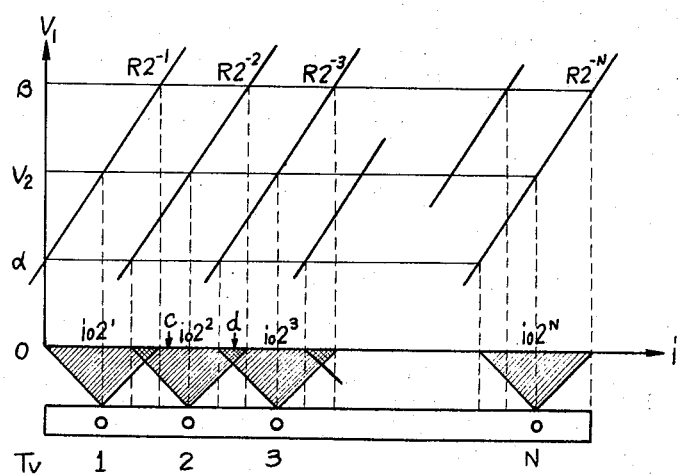

QUANTIZED INDICATION ARRANGEMENT

BACKGROUND OF THE INVENTION

The present invention relates to an arrangement for quantized indication of the light measurement value and, more specifically, to quantized indication of the exposure time value based on the light measurement value obtained in cameras having electrically controlled shutter or in electric exposure meters.

Conventionally, such light measurement values and exposure time values have been indicated by ammeters as analogue indications. However, there are disadvantages which are hard to eliminate, e.g. mechanical troubles are liable to occur, the scale is hard to read in dusk, etc.

In order to eliminate such drawbacks, in quantized indication system of the conventional type, the input signals are transformed into a pulse number which is counted by multiple stage pulse counters, and the counted number is memorized and indicated. The disadvantage of this method is that when the input signal is continuously changing, it is necessary to reset and then to again make pulse number transformation of the input signal and count the pulse number. As a result, it is difficult to make continuous indication. An improved method for continuous indication is the so-called parallel quantizing system where simultaneous comparison of the input signal is made with previously provided multiple threshold value voltages. In this case, however, the necessary circuit is complicated and a great number of elements are needed. Further, such arrangement is not always practical with regard to its reliability and price.

SUMMARY OF THE INVENTION

The present invention provides novel means for eliminating the above-mentioned drawbacks of quantized indication method according to the conventional art.

Briefly, an embodiment of the invention is in a quantized indicating unit. A controllable constant current source is connected in a circuit path for current flow. A plurality of impedance means is provided together with means for selectively coupling any one of the impedance means in the path for current flow. Means is provided for sequentially scanning through a sequence of states. The coupling means responds to each different one of the states for coupling at least one different impedance means into the current path, thereby causing, for each of the states, a signal on the coupled impedance means corresponding to the amount of the current flow and to the coupled impedance means. A source of a reference signal is provided together with means for comparing a signal with the reference signal. An indicating element is provided for each of the impedance means. Means is coupled to the scanning means and the comparing means and is responsive to a correspondence detected by the comparing means for switching an indicating element into an indicating condition, which element corresponds to the impedance means that is coupled into the current path.

BRIEF DESCRIPTION OF THE DRAWINGS

FIGS. 1 and 2 show fundamented structures of two examples of the quantized indication arrangement according to the present invention;

FIG. 3 is a schematic diagram of the arrangement according to the present invention in which the fundamental structure is provided together with structure for an additional function;

FIG. 4 is a circuit diagram of one example of a circuit for light measurement and photographic computation in a camera provided with an electrically controlled shutter; and FIGS. 5 and 6 are graphs showing the operation of quantized indication of the arrangement according to the present invention.

DESCRIPTION OF THE PREFERRED EMBODIMENT

Consider first the theory of operation of the invention. With regard to photographic exposure value determining factors, namely object brightness B, film sensitivity value S, objective diaphragm value A and exposure time T, the following relation exists in accordance with the APEX system:

$$T_V + A_V = B_V + S_V \quad (1)$$

The letters having subscripts V represent the APEX represented values $T$, $A$, $B$ and $S$. The photographic computation represented by the formula 1 is carried out with logarithmic transformation of the exposure value determining factors B, S, A and T. A light input B produces a voltage variation $V_B$ which is proportional to the APEX represented value $B_V$. Let a voltage $v_o$ correspond to the unit amount (unity : 1) variation of the value $B_V$, then $$V_B = B_V \cdot v_o \quad (2)$$

The diaphragm value A and the film sensitivity value S are respectively added in the formula 1 and the exposure time T is determined. In the same manner as the equation 2, the following voltage variations are obtained:

$$V_A = A_V \cdot v_o$$
$$V_S = S_V \cdot v_o$$

According to the formula 1, a voltage variation $$T_V \cdot v_o = (B_V + S_V - A_V) v_o \quad (3)$$

is obtained by an electric computation circuit. This voltage variation $T_V \cdot v_o$ is inverse-logarithmically transformed (logarithmically expanded) and a current is obtained which is inversely proportion to the exposure time T corresponding to the value $T_V$. Exposure time control is carried out by constant-current charging a capacitor up to a certain voltage value. This current is inversely proportional to the exposure time T. When this current is applied to the arrangement according to the present invention as an input signal, it is possible to carry out quantized indication of exposure time T. The photoelectric transformation output current determined by object brightness B is applied to the arrangement according to the present invention as an input signal, making it possible to carry out quantized indication of object brightness B.

A detailed description of the quantized indication arrangement according to the present invention will now be given.

FIGS. 1 and 2 show the fundamental structure of the arrangement according to the present invention. In the drawings there are shown a source of clock pulses or a clock pulse generator 1; a distributor 2 which is intended, like a ring counter for driving scanning switches in sequence by input pulses; scanning switches 3-1, 3-2, . . ., 3-N; and detecting resistors 4-1, 4-2, . . ., 4-N, whose values are determined on the basis of quantizing levels. The scanning switches and the detecting resistors are respectively N in number, corresponding to the number of samplings for quantization. The numeral 5 denotes a reference voltage source. A comparing means or coincidence circuit 6 is provided for producing an output signal when two input voltages coincide each other within a certain tolerance range. The output signal is for controlling the open-close actions of gate circuits. Further shown in the drawings are a constant current source 7 whose current value is determined corresponding to the input signal to be quantized, indicating elements 8-1, 8-2, . . . 8-N which are N in number corresponding to the number of samplings for quantization, gate circuits 9 and 11 and a power source 10.

In FIG. 1, the scanning switches 3-1, 3-2, . . . 3-N are scanned in sequence due to the pulses produced by the clock pulse generator 1, causing the distributor to sequence in accordance with the frequency of the clock pulses. The constant current source 7, whose current value is determined corresponding to the input signal for quantization, is connected to the detecting resistors 4-1, 4-2, . . . 4-N with respective scanning switches 3-1, 3-2, . . . 3-N, as shown in the drawings. Thus, in conjunction with the power source 10, the scanning switch 3-1 and the detecting resistor 4-1, the scanning switch 3-2 and the detecting resistor 4-2, . . . the scanning switch 3-N and the detecting resistor 4-N are time-sequentially scanned and are connected to the constant current source 7.

To the coincidence circuit 6 there are applied a voltage drop $V_1$ determined by the current value $i$ of the constant current source and each value of the detecting resistors 4-1, 4-2, . . . 4-N and the reference voltage $V_2$ of the reference voltage source 5. When $V_1$ and $V_2$ coincide with each other within a certain tolerance range, the coincidence circuit produces an input signal, which is applied to the gate circuit 9 and this causes the gate circuit 9 to be opened. With the scanning switches 3-1, 3-2, . . ., 3-N, the indicating elements 8-1, 8-2, . . ., 8-N, such as light emission diodes or lamps, are respectively connected to the gate circuit 9. The output signal from the coincidence circuit 6 selects one of the current supply circuits of the indicating elements corresponding to respective quantization levels, and, as a result, the indicating element of this selected current supply circuit is lighted. The lighting time duration and repeat period are determined by the clock pulse frequency and the sampling number in a well-known manner. Thus, the distributor 2 forms a circuit or scanning means having a sequence of states and the switches 3-1, 3-2, . . ., 3-N, together with the gate circuit 9, form means for coupling the resistors into the current path formed through the current source 7.

In FIG. 2 there is shown an embodiment of the invention in which, between a clock pulse generator 1 and a distributor 2, there is provided a gate circuit 11 whose action is regulated by an output signal from the coincidence circuit 6. This gate circuit 11 is of normally open type so that the pulses from the clock pulse generator 1 normally pass through the gate circuit 11 and are applied to the distributor 2. Other parts of the arrangement act in the same manner as that of the example of FIG. 1. An output signal from the coincidence circuit 6 causes the gate circuit 9 to be opened and the gate circuit 11 to be closed so that the clock pulse input to the distributor 2 is stopped. As a result, the action of the distributor 2 at this moment is retained and the selected indicating element is kept lighted.

In the embodiment of the invention shown in FIG. 3, the output signal from the coincidence circuit 6 is applied to the gate circuit 11 through a normally closed-type switch 12 and a memory circuit 13, such as a flip-flop circuit. When the switch 12 is opened after quantized indication of an input signal is carried out, then the indicating element, which was selected immediately before opening of the switch 12, is kept lighted to provide a constant indication irrespective of variation or non-existence of the input signal to be quantized thereafter. When the switch 12 is closed, quantized indication is again carried out in accordance with the input signal, and further the indicating element selected thereby is kept lighted. The structure of the example of FIG. 3 consists of the fundamental structure of the example of FIG. 2 with a part thereof altered. Other parts of the structure are entirely the same as FIG. 2 and a description thereof is accordingly omitted.

A description will now be made of an application of the quantized indication arrangement according to the present invention to an exposure time indicator of an electrically controlled shutter type camera.

FIG. 4 is a circuit diagram of an embodiment of the invention for light measurement and photographic computation as indicated by the formula 3 in an electrically controlled shutter arrangement. In the drawing there are shown a diaphragm value and film sensitivity value setting variable resistor 14 whose resistance value is determined in accordance with the objective diaphragm value A and the film sensitivity value S, a silicon PN-junction type light receiving element 15, a logarithmic transformation diode 16, an FET : 17, an inverse logarithmic transformation (logarithmic expansion) transistor 18, and a power source 10.

The operation of this arrangement is as follows.

First the resistance value of the variable resistor 14 is set in accordance with the objective diaphragm value A and the film sensitivity value S so that this set resistance value controls the input current to the logarithmic transformation diode 16 from the power source 10. As a result, across the logarithmic transformation diode 16 there is developed an electric amount $(S_V - A_V) \cdot v_o$ based on an addition formula $S_V - A_V$ which is the addition of the APEX represented values of the objective diaphragm value A and the film sensitivity value S. Further, across the silicon light receiving element 15 there is developed an electric amount $B_V \cdot v_o$ based on the APEX represented value $B_V$ of the object brightness B. Accordingly, the gate voltage of FET : 17 is $(B_V + S_V - A_V) \cdot v_o$, which is an electric amount $T_V \cdot v_o$ based on the APEX represented value $T_V$ of the exposure time T.

When the value $T_V \cdot v_o$ is applied to the inverse logarithmic transformation transistor 18 through a high input resistance type buffer circuit of FET : 17, then logarithmic expansion is carried out due to the diode action between the base and the emitter of the transistor 18. The collector current of the transistor 18 is of a value which is inversely proportional to the exposure time T and acts as a sort of constant current source having a constant current characteristic due to the collector voltage-current characteristic of transistor. Accordingly, the transistor 18 can be utilized as the constant current source for the quantized indication arrangement according to the present invention.

A description will now be given of the operation of the circuit of FIG. 1, according to the present invention, in which a constant current source having a function as shown in FIG. 4 is utilized as a constant current source 7.

If quantized indication of exposure time is to be made with respect to $T_V = 1, 2, \ldots, N$, then the resistance values $R_{4-1}, R_{4-2}, \ldots, R_{4-N}$ of the detecting resistors 4-1, 4-2, ..., 4-N (N in number) respectively, are established as follows: $R_{4-1} = R_o 2^{-1}, R_{4-2} = R_o 2^{-2}, \ldots, R_{4-N} = R_o 2^{-N}$. Thus, generally, the resistance value R of a detecting resistor is given by: $R = R_o 2^{-T_V}$, where $R_o$ is a resistance value which is properly determined in circuit design.

A current value of $i$ through constant current source 7 is the collector current of the transistor 18 and is hereinafter referred to as the signal current $i$. Assume $T_V = 1, 2, \ldots, N$ and $i = i_o 2^{T_V}$, where $i_o$ is a value which is properly determined in circuit design. The voltage drop $V_1$ produced by a signal current $i$ corresponding to a $T_V$ value and the value R of a scanned detecting resistor is as follows: $V_1 = i \cdot R$. Concerning the coincidence circuit 6, the reference voltage $V_2$ of the reference voltage source 5 is so established that $V_2 = i_o \cdot R_o$. Further, threshold values are so established that when $V_2 - \alpha \leq V_1 < V_2 + \beta$ the coincidence circuit produces an output signal for opening the gate circuit 9. $\alpha$ and $\beta$ are tolerance ranges contained in the quantized value of $T_V$ when a signal current based on a $T_V$ value is quantized to the corresponding $T_V$ value. When, for example, the tolerance range is $\pm 0.5 E_V$ $$V_2 - \alpha = V_2 \cdot 2^{-0.5}, V_2 + \beta = V_2 \cdot 2^{0.5}.$$

These relations are shown in FIG. 5, where the $i$-ranges indicated by hatched inverted triangles with the apexes pointing to the indicating elements are respectively the indicating ranges of the indicating elements. For example, when $i$ is of a value which the arrow a points to, the indicating element for $T_V = 1$ is lighted; and when $i$ is of a value which the arrow b points to, the indicating element for $T_V = 3$ is lighted.

With the quantized indication arrangement according to the present invention, the sampling number can be increased without any increase of constituent elements (circuit elements) and only by properly establishing the values $\alpha$ and $\beta$. One example of this will be described in conjunction with FIG. 6. The values $\alpha$ and $\beta$ are so established that the neighboring ranges due to $T_V$ threshold values partly overlap each other. The $i$-ranges indicated by left-down hatched inverted triangles whose apexes point to corresponding indicating elements are respectively the indicating ranges of the indicating elements. Within that part of the $i$-ranges which are indicated by right-down hatched inverted triangles due to partial overlapping of the larger inverted triangles, the indicating elements corresponding to said larger inverted triangles are time-sequentially lighted.

For example, when $i$ is of a value which the arrow c points to, the indicating element for $T_V = 2$ is lighted, while when $i$ is of a value which the arrow d points to, the indicating elements for $T_V = 2$ and $T_V = 3$ are time-sequentially lighted. Thus, the sampling number for quantized indication can be increased by coding, for example by lighting of a single indicating element and of two neighboring indicating elements, without any addition of circuit elements.

The foregoing is an example of the present invention in which the quantized indication arrangement according to the present invention is applied to the quantized indication of exposure time in an electrically controlled shutter camera. Further, it is clear that the quantized indication arrangement according to the present invention can be applied for other purposes of wider and more general range by an arrangement such that continuous physical amounts are transformed into corresponding currents which is one of fundamental constituent elements of the arrangement according to the present invention. The greatest feature of the quantized indication arrangement according to the present invention is that the structure is very simple and accordingly needs comparatively few circuit elements. In conventional pulse counter system for quantization of this kind, the stability of clock pulse frequency exerts great influence upon the stability of the quantized indication arrangement so that stability of frequency is greatly required. In the quantized indication arrangement according to the present invention, however, the stability of clock pulse frequency has in principle nothing to do with the stability of the quantized indication arrangement. Accordingly, it is possible to provide a quantized indication arrangement of very high stability and of very simple circuit structure with very low cost, thus providing a very great advantage.

Although an exemplary embodiment of the invention has been disclosed for purposes of illustration, it will be understood that various changes, modifications and substitutions may be incorporated in such embodiment without departing from the spirit of the invention as defined by the claims appearing hereinafter.

What is claimed is:

1. A quantized indicating unit comprising:
   a controllable constant current source connected in a circuit path for current flow;
   a plurality of impedance means;
   means for selectively coupling any one of said impedance means in said path for current flow;
   means for sequentially scanning through a sequence of states, said coupling means responding to each different one of said states for coupling at least one different impedance means into said current path, thereby causing, for each of said states, a signal on said coupled impedance means corresponding to the amount of said current flow and to the coupled impedance means;
   a source of a reference signal;
   means for comparing said signal with said reference signal;
   an indicating element for each of said impedance means; and
   means coupled to said scanning means and comparing means and responsive to a correspondence detected by said comparing means for switching an indicating element into an indicating condition which element corresponds to the impedance means that is coupled into said current path.

2. A quantizing unit according to claim 1 wherein said impedance means has one end coupled together in common into said current path and said means for switching comprises switch means coupled to all of said impedance means for coupling a second end of any of said impedance means into said current path.

3. A quantizing unit according to claim 2 wherein said impedance means are arranged in parallel and said coupling means couples a second end of said impedance means into said current path.

4. A quantizing unit according to claim 1 wherein said scanning means comprises a source of clock pulses and circuit means responsive to said pulses for stepping from one state to the next through said series of states.

5. A quantizing unit according to claim 4 comprising disabling means coupled to said source of clock pulses and said comparing means for preventing application of the clock pulses to said circuit means responsive to said predetermined correspondence and thereby retain the corresponding indication of said indicating means.

6. A quantizing unit according to claim 5 wherein said disabling means coupled to said source of clock pulses and said comparing means comprises gate means coupled between said source of clock pulses and said circuit means.

7. A quantizing unit according to claim 5 comprising controllable switch means coupled to said comparing means and memory means coupled between said switch means and said disabling means, switching of said switching means to a first state causing said memory means to control said disabling means and thereby prevent application of said clock pulses to said circuit means.

8. A quantizing unit according to claim 1 wherein said impedance means comprises a resistor.

9. A quantized indicating unit comprising:
a controllable constant current source connected in a circuit path for current flow;
a plurality of parallel resistors;
means for selectively coupling any one of said resistors in said path for current flow;
means for sequentially scanning through a sequence of states, said coupling means responding to each different one of said states for coupling at least one different resistor into said current path, thereby causing, for each of said states, a signal on said coupled resistor corresponding to the amount of said current flow and to the coupled resistor;
a source of a reference signal;
means for comparing said signal with said reference signal;
an indicating element for each of said resistors; and gate means coupled to said scanning means and comparing means and responsive to a correspondence detected by said comparing means for switching an indicating element into an indicating condition which element corresponds to the resistor that is coupled into said current path.

* * * * *

PO-1050
(5/69)

UNITED STATES PATENT OFFICE
CERTIFICATE OF CORRECTION

Patent No. 3,828,253      Dated Aug. 6, 1974

Inventor(s) Chiharu Mori

It is certified that error appears in the above-identified patent and that said Letters Patent are hereby corrected as shown below:

In the specification, Column 5, lines 20 and 21,

"$R_{4-1}= R_o 2^-1, R_{4-2}=R_o 2^-2, \ldots, R_{4-N}=R_o 2^-N.$"

should read

-- $R_{4-1}=R_o 2^{-1}, R_{4-2}=R_o 2^{-2}, \ldots, R_{4-N}=R_o 2^{-N}.$ --

Signed and sealed this 3rd day of December 1974.

(SEAL)
Attest:

McCOY M. GIBSON JR.       C. MARSHALL DANN
Attesting Officer      Commissioner of Patents